United States Patent [19]

Pavone

[11] Patent Number: 4,589,746
[45] Date of Patent: May 20, 1986

[54] DUAL-AXIS, SINGLE MIRROR INTERFEROMETER MEASURING SYSTEM

[75] Inventor: Robert J. Pavone, South Windsor, Conn.

[73] Assignee: The Gerber Scientific Instrument Company, South Windsor, Conn.

[21] Appl. No.: 375,981

[22] Filed: May 7, 1982

[51] Int. Cl.⁴ .................... G03B 41/00; G01B 11/02
[52] U.S. Cl. ........................................ 354/4; 356/358
[58] Field of Search ............................ 354/4; 356/358

[56] References Cited

U.S. PATENT DOCUMENTS 3,848,520 11/1974 Webster et al. ......................... 354/4
3,884,580 5/1975 Webster et al. ..................... 356/358

Primary Examiner—Michael L. Gellner
Attorney, Agent, or Firm—McCormick, Paulding & Huber

[57] ABSTRACT

A photoplotter having a photohead that moves in one coordinate direction and a film table movable in another coordinate direction employs a dual-axis, single mirror and reflector interferometer system for measuring movement of the film and photohead relative to one another. The photohead is mounted on a bridge over the movable film table and a first interferometer mounted on the head cooperates with an elongated mirror at the edge of the table for measuring the relative position of the film and head in the first coordinate direction. Another interferometer mounted on the bridge cooperates with a retroreflector on the head to measure movement of the head relative to the film in the second coordinate direction. The two measurements from the interferometers are employed as feedback signals in a closed loop positioning system for the photohead and table.

15 Claims, 4 Drawing Figures

DUAL-AXIS, SINGLE MIRROR INTERFEROMETER MEASURING SYSTEM

BACKGROUND OF THE INVENTION

The present invention relates to high accuracy positioning and measuring systems of the type employed to control the location and translation of a tool relative to a workpiece. More particularly, the invention relates to a laser interferometer system that is used for positioning a photohead relative to film on a work table.

U.S Pat. No. 3,884,580 having the same assignee as the present invention discloses an interferometer system that is used for position feedback in a high-accuracy positioning control for a photoplotter or other automatic positioning equipment. Laser interferometers are ideally suited for position control because of their high accuracy. However, due to the expense of the optical components that are employed in laser systems, their use is generally reserved to systems where accuracies of ten thousands of an inch or less are required. A photoplotter employed to produce masks for microcircuits is one example of equipment that requires such accuracy.

In plotters and other devices which operate on film or other workpieces having at least two principal dimensions, the photohead or other tool must be accurately positioned relative to the workpiece along two coordinate axes. In the prior art systems having dual axis positioning devices, two interferometers and two elongated mirrors are required so that the measuring axis of each interferometer is at all times intersecting a reflective surface. The length of the mirrors in each coordinate direction must be at least as long as the maximum span of the work along those axes, and preferably somewhat greater, and with large spans very costly, heavy and delicate mirrors were required.

It is accordingly an object of the present invention to provide a dual axis interferometer measuring system that utilizes only a single elongated mirror for one of the axes, generally the axis having the smaller displacement, and a small reflector for the other axis without substantially diminishing the accuracy otherwise available from interferometer measuring systems.

SUMMARY OF THE INVENTION

The present invention resides in a high accuracy positioning system for moving a tool such as a photoplotter relative to a film or other workpiece in two coordinate directions. The apparatus includes a stationary support or frame on which a work table is mounted for movement back and forth relative to the frame in a first coordinate direction. The table has a work surface extending parallel with the first coordinate direction and a second coordinate direction orthogonal to the first.

A tool carriage is also mounted on the frame for movement back and forth relative to the support and the support surface of the table in the second coordinate direction. The carriage has a mount for holding a photohead or other tool in operative relationship with the film or other workpiece held on the work surface of the table. Drive motors connected respectively with the work table and the tool carriage move the table and photohead relative to one another during a work operation, and typically the movements are controlled automatically from a program tape or other source of plotting data.

A first interferometer is mounted on the tool carriage and is positioned with the sensitive measuring axis of the interferometer extending in the first coordinate direction. A first reflector in the form of an elongated mirror is mounted on the work table and has a reflective surface intersecting the measuring axis of the interferometer. The reflecting surface extends in the second coordinate direction a distance commensurate with the movement of the tool carriage and the first interferometer in that direction for measuring table position.

A second interferometer and a second reflector are mounted on the frame and the tool carriage with the measuring axis of the interferometer extending in the second coordinate direction and intersecting the reflector for measuring the carriage position.

Accordingly, in the first coordinate direction, a direct measure of the movements between the tool carriage and the work table is made by the first interferometer and the elongated mirror. The extended reflecting surface of the mirror insures an accurate reading from the first interferometer regardless of the position of the tool carriage in the second coordinate direction. The relative position of the carriage and table in the second coordinate direction is made with the aid of the second interferometer and reflector. Since the tool carriage moves in the second coordinate direction and the measuring axis of the second interferometer extends in the second coordinate direction, there is no need for an elongated mirror or other reflector for that control axis. As a result, only one elongated mirror and one small reflector are needed for the interferometer measuring system.

DESCRIPTION OF THE PREFERRED EMBODIMENTS

Figure 1:
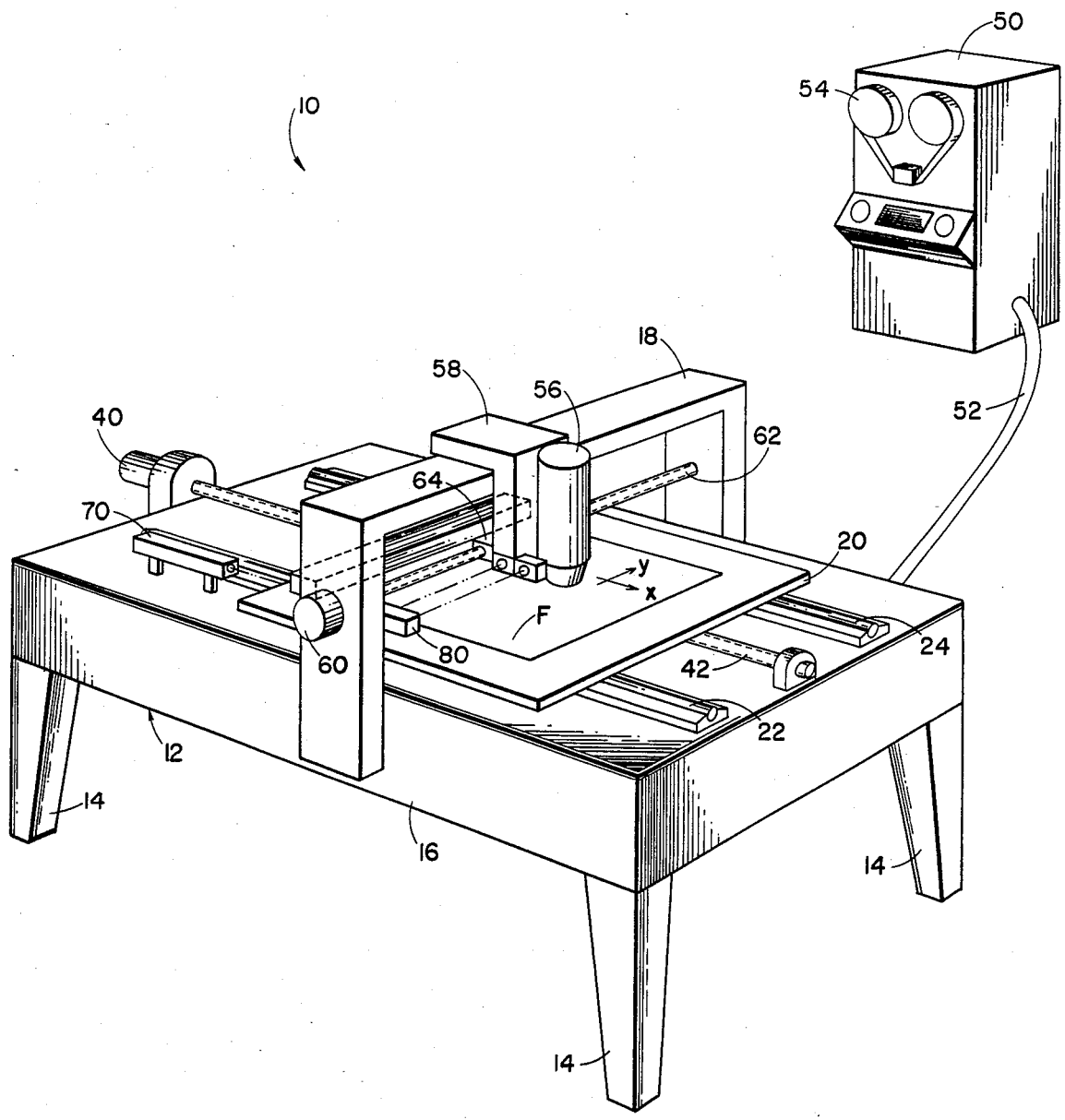
FIG. 1 is a perspective view of a photoplotter incorporating the present invention.

FIG. 1 illustrates a photoplotter, generally designated 10, that is employed to expose a film plate F with lines and symbols that are located with an accuracy of ±0.0002 inch. The film may have an area of 32 inches by 40 inches (80 cm by 100 cm), and typically such a film plate would be employed as the artwork for a printed circuit or microcircuit. The spacing and accuracy of the characters and lines generated on the film is most critical to the performance of the end product, particularly for high density microcircuits. The invention, however, is not limited to the photoplotter application and may be used with other tools and workpieces which are moved relative to one another in at least two coordinate directions.

The photoplotter includes a stationary support frame 12 having legs 14, a support platform 16 and an overlying bridge 18. The bridge is rigidly connected to the platform and spans the midsection of the platform at an elevated height.

Figure 3:
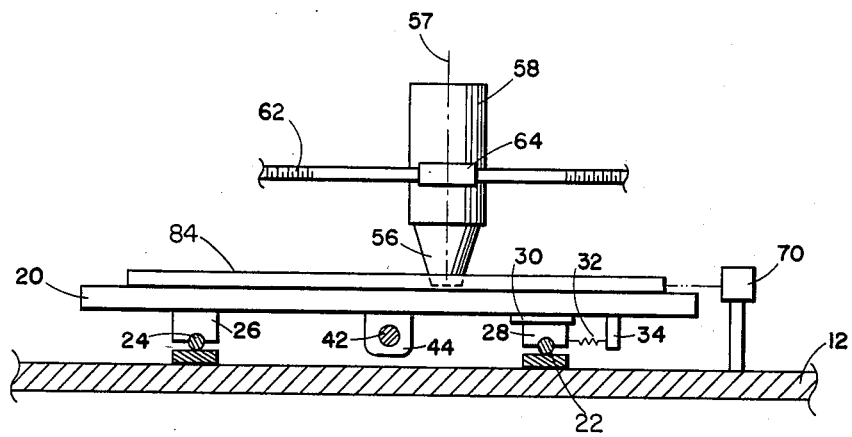
FIG. 3 is a side elevation view schematically showing the photoplotter in FIG. 1.

A work table 20 has a work surface on which the film plate F is held by vacuum or the means as defined, for example, in my copending U.S. Pat. No. 4,468,017, entitled VACUUM ZONE CONTROL VALVE. The table is mounted on the platform 16 for movement in the illustrated X-coordinate direction by means of a pair of round ways 22, 24. Both of the ways are fixedly secured to the platform 16. As shown in FIG. 3, a pillow block 26 that travels on the way 24 is fixedly connected to the table 20. But the corresponding pillow block 28 traveling on the way 22 abuts a bed plate 30 in sliding relationship and is laterally aligned with the table through a plurality of spring links 32 and a bulkhead 34. The bed plate and spring links allow the block 28 to accommodate any alignment tolerances between the two ways 22, 24 and the associated connections between the ways, the stationary frame 12 and the work table 20. More importantly, the way 24 becomes the principal way determining the alignment and movement of the work table in the X-coordinate direction. Ambiguities regarding any tolerances between the two ways are thus resolved in favor of the way 24.

Movement of the table 20 in the X-coordinate direction is produced by means of an X-drive motor 40, a single ball lead screw 42 rotatably driven by the motor, and a ball nut 44 connected with the central portion of the table as shown in FIGS. 1 and 3 for balanced driving forces. The ball nut in conventional fashion has a series of recirculating balls that are pressure loaded against the helical grooves of the lead screw 42 to eliminate any backlash in the positioning mechanism.

The drive motor 40 is connected to a plot controller 50 through a command signal cable 52. The controller 50 derives plotting commands from a program tape 54 and transmits the commands to the drive motor 40 in order to position the work table 20 and the film F thereon at various locations along the X-coordinate axis during a plotting operation.

An optical photohead 56 is supported and moved over the film plate F by means of a tool carriage 58. The photohead has an optical axis 57 extending generally perpendicular to the photosensitive surface of the film plate F and the X and Y coordinate axes, and by projecting a beam of light along the axis, the photohead exposes the film surface. Exposure can occur while the film plate and photohead are moving relative to one another so that a continuous line is exposed, or the film and head may be held stationary as aperture plates inserted in the light beam flash specially contoured configurations on the film. For a more complete description of a photohead apparatus itself, reference may be had to U.S. Pat. No. 3,848,520.

The tool carriage 58 is mounted on the bridge 18 in FIG. 1 for movement along the bridge in illustrated Y-coordinate direction. Movement of the tool carriage is produced by means of a Y-drive motor 60, a single ball lead screw 62 connected to the motor and a ball nut 64 attached to the tool carriage 58. Command signals also derived from the program tape 54 are supplied by the controller 50 to the Y-drive motor 60 to position the photohead transversely along the bridge 18 relative to the film plate F. It will be understood that composite movements of the film and photohead by means of the X and Y drive motors 40, 60 allow the photohead to expose any area of the photosensitive surface of the film F.

In accordance with the present invention, movements of the photohead 56 and the work table 20 are measured by means of a laser interferometer system in order to accurately expose a plot on the film plate F. The interferometer system is a dual axis system for measuring motion in both the X and Y coordinate directions, and is shown generally in plan view in FIG. 2. The system includes a helium-neon laser 70 mounted on the stationary frame 12 in FIG. 1 for generating a laser beam that is used to measure along both coordinate axes, an X-axis photodetector 72 for measuring movements along the X-axis and a Y-axis photodetector 74 for measuring movements along the Y-axis. The generated laser beam is transmitted to a beam splitter 76 mounted on the bridge 18 in FIG. 1, and the beam splitter directs one portion of the beam to the X-axis interferometer 78 mounted on the tool carriage 58 and another portion of the beam to the Y-axis interferometer 80 also mounted on the bridge 18. The X-axis interferometer 78 is a plane mirror interferometer and has a measuring axis 82 in FIG. 2 extending between the interferometer and an elongated, first-surface mirror 84 extending along one edge of the work table 20. The reflective surface of the mirror is perpendicular to the measuring axis 82 and is elongated in the Y-coordinate direction so that the measuring axis intersects the reflective surface at each position of the tool carriage 58 along the ball lead screw 62. It is also preferred that the measuring axis 82 intersect the optical axis 57 of the photohead 56 to minimize Abbe error as described in U.S. Pat. No. 3,884,580. Abbe error is an important consideration in high accuracy positioning systems and is an error that is generated by non-parallelism of the measuring axis and the actual plane of interest, and is proportional to the separation of the measuring axis and the plane of interest.

The term "measuring axis" refers to the axis along which an interferometer projects a beam or beams of coherent light to a remote reflector for the purpose of measuring relative movement between the interferometer and the reflector. The axis may in fact be the median line between two or more parallel beams of light and the beams may be deflected at points between the interferometer and reflector so that the measuring axis is bent with two or more portions extending in different directions. The term "intersect" is intended to refer to the geometric condition in which a line or extension of the that line passes through a specific point, line or plane.

The Y-axis interferometer 80 is a linear interferometer and has a measuring axis 86 extending between the interferometer and a retroreflector 88 mounted on the tool carriage 58. Since the tool carriage moves in the Y-coordinate direction parallel with the axis 86, the retroreflector 88 is not elongated and remains in intersecting relationship with the axis 86 at each position of the tool carriage and the work table 20 without elongation. It is also preferred that the measuring axis 86 intersect the optical axis 57 to minimize Abbe error as mentioned above.

By examining the positioning errors that arise due to bending of the way 24 which guides movement of the table in the X-coordinate direction and bending of the bridge 18 which guides movement of the photohead in the Y-coordinate direction, it can be shown that the laser interferometer system detects and corrects for the most significant errors. If the round way 24 is not precisely parallel to the measuring axis 82 of the X-interferometer 78, or if there is a bend in the way, then the first surface mirror 84 will detect Abbe errors created along the X-axis and correct the positioning of the table accordingly. The more remote the tool carriage 58 is from the round way 24, the greater the error but the error is nevertheless detected. It is also recognized that misalignment or bending of the round way 24 produces errors in the Y-coordinate direction, but such errors are small and are not proportional to offset from the round way as is the case of Abbe errors.

In the Y-coordinate direction, the straightness and parallelism relative to the measuring axis 86 are determined by the straightness of the first surface of the mirror 84 which is polished to a very high tolerance and straightness. Therefore, the bridge 18 on which the tool carriage is movably mounted is the major source of Abbe error in the Y-direction. Such error, however, is minimized because the measuring axis 86 extends through the optical axis 57 at each position of the tool carriage 58, and any offset created by a bow in the beam and correspondingly any Abbe error is minimal.

Figure 2:
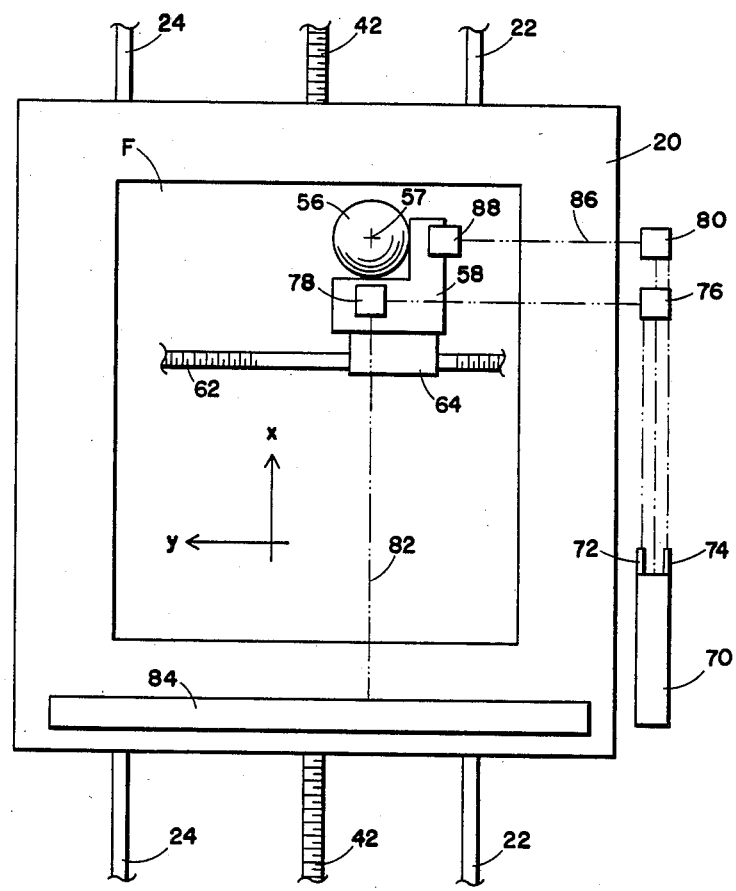
FIG. 2 is a top plan view schematically illustrating the photoplotter of FIG. 1 and illustrates the principal measuring axes of the laser interferometers.

It will also be apparent from FIGS. 2 and 3 that Abbe error is minimized by locating the measuring axes 82, 86 as close as possible to the film plane or support surface of the film table 20 by appropriate location of the laser 70 and the interferometers 78 and 80.

Figure 4:
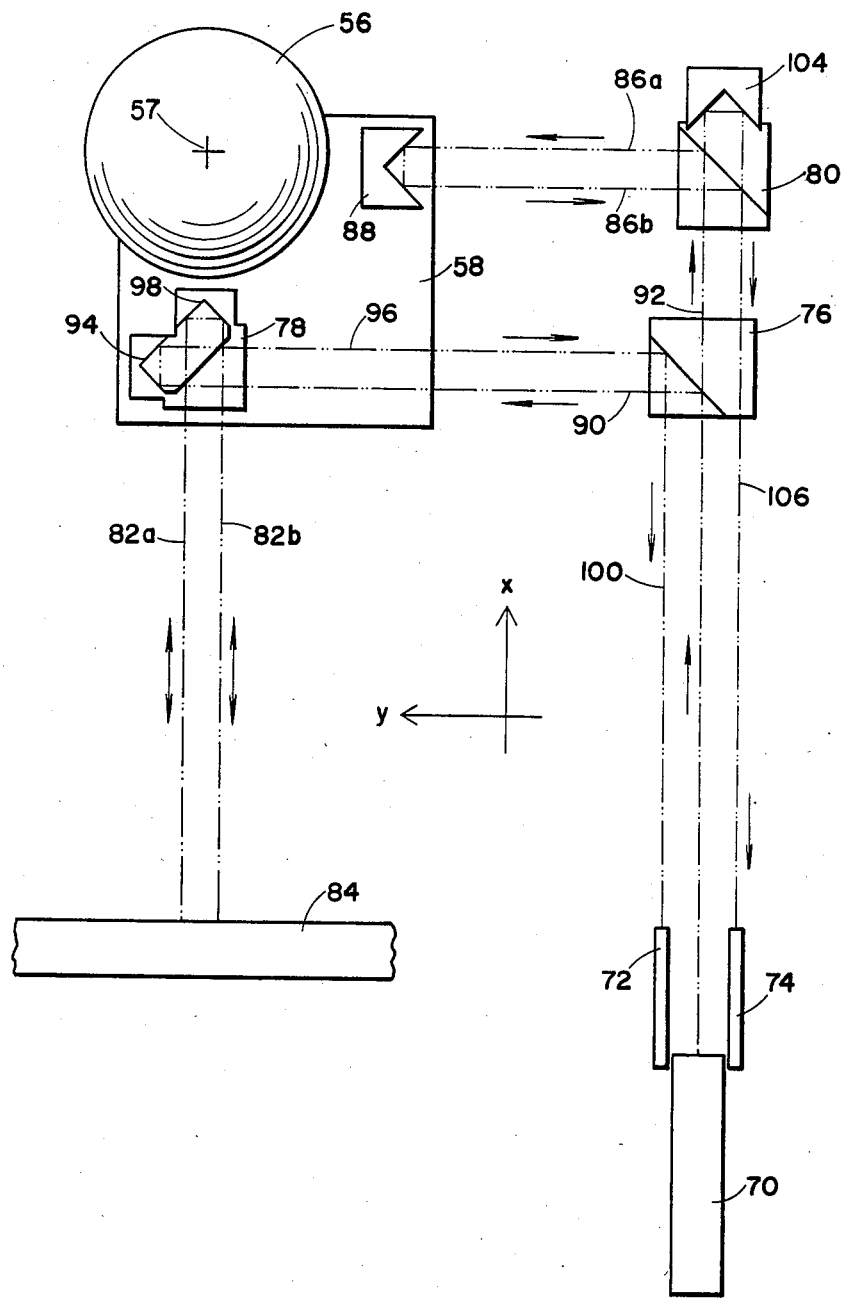
FIG. 4 is a diagram showing the details of the laser interferometer measuring system in the photoplotter of FIG. 1.

The detailed operation of the interferometer system is explained and illustrated in connection with FIG. 4. The helium-neon laser 70 emits a coherent light beam composed of two slightly different optical frequencies, one of which is used, through appropriate polarizations, as the reference beam to accommodate variations in the beam path between the laser and the interferometers, and the other of which is used as the measuring beam through corresponding polarizations. The two-frequency beam is transmitted from the laser 70 to the beam splitter 76 where the beam is split with one portion being directed to the plane mirror interferometer 78 along the axis 90 and another portion being directed to the linear interferometer 80 along the axis 92.

In the interferometer 78, the reference frequency is reflected by the cube corner 94 directly back to the beam splitter along axis 96 and from the beam splitter to the X-axis detector 72 along axis 100. The measurement frequency is deflected 90 along the measuring axis 82a to the mirror 84 and back to a cube corner 98 where it is again reflected to the mirror 84 along the axis 82b through a plane mirror polarization converter (not shown). The second reflection from the mirror 84 has been doppler shifted twice by movements of the mirror 84 and table 20 in the X-coordinate direction, and is returned to the X-axis detector 76 along the axes 96 and 100 by the beam splitter 76. The photodetector 72 senses the fringe patterns caused by the movement, and a counter and other circuitry within the detector calculates the measured movement from the fringe count and provides a representative feedback signal to the controller 50 in FIG. 1.

Measurements in the Y-coordinate direction are accomplished similarly except that only a single reflection and doppler shift occurs. The reference frequency from the laser 70 is reflected directly back to the Y-axis photodetector 74 by the cube corner 104. The measuring frequency is transmitted to the retroreflector 88 along the measuring axis 86a and back to the interferometer along the axis 86b. The doppler shifted frequency created by movement of the photohead 56 is then reflected along the axis 106 to the detector where the fringe count is detected. The measured movement is calculated and fed back as a signal to the controller 50 in FIG. 1.

In summary, a photoplotter 10 has been described with a laser interferometer measuring system for detecting movements of the photohead and film along two coordinate axes. The interferometer system includes a single elongated mirror on one coordinate axis and a retroreflector that remains continuously aligned with the associated interferometer on the other coordinate axis. The arrangement of the interferometers and reflectors minimizes Abbe error to improve the overall accuracy of the system and eliminates the weight and expense of a second long mirror on the table or head. Movements in each coordinate direction are produced by a single ball nut and lead screw.

While the present invention has been described in a preferred embodiment, it should be understood that numerous modifications and substitutions can be had without departing from the spirit of the invention. For example, the beam splitter 76 could be mounted on the tool carriage along with the interferometer 80, and the retroreflector 88 could then be mounted on the stationary frame 12. It is preferable, however, to minimize the number of components that are moved with the photohead, and the arrangement of the components described above is consistent with that goal. It is also feasible to locate the plane mirror 84 on the tool carriage and the interferometer 78 on the film table in continuous registration with the beam transmitted from the laser 72. However, since the table rather than the carriage is more suitably adapted to support an elongated object, the mirror 84 is mounted along the edge of the table. Accordingly, the present invention has been described in a preferred embodiment by way of illustration rather than limitation.

I claim:

1. A high accuracy positioning system for moving a tool and a workpiece relative to one another in two coordinate directions comprising:

a stationary support;

a movable work table mounted on the stationary support for movement back and forth relative to the support in a first coordinate direction, and having a work surface extending parallel with the first coordinate direction and a second coordinate direction orthogonal to the first coordinate direction for holding a workpiece thereon;

a tool carriage also mounted on the stationary support for movement back and forth relative to the support and the work table in the second coordinate direction, and providing a mount for holding a tool in operative relationship with the workpiece held on the work surface of the table;

a first drive means connected between the stationary support and the movable work table for moving the table back and forth in the first coordinate direction;

second drive means connected between the stationary support and the movable tool carriage for moving the carriage and a tool thereon back and forth in the second coordinate direction;

a first interferometer mounted on the movable tool carriage and positioned with the sensitive measuring axis extending in the first coordinate direction;

a first reflector mounted on the work table and having a reflecting surface intersecting the measuring axis of the first interferometer and extending in the second coordinate direction a distance commensurate with the movement of the tool carriage and the first interferometer in the second coordinate direction for measuring table position in the first coordinate direction;

a second interferometer and second reflector, one mounted on the tool carriage and the other on the stationary support, and both being positioned with the sensitive measuring axis of the second interferometer extending in the second coordinate direction and intersecting the reflective surface of the second reflector for measuring carriage position in the second coordinate direction; and control means connected with the first and second interferometers and the first and second drive means for accurately positioning the table and carriage in accordance with the measurements obtained from the interferometers.

2. A high accuracy positioning system as defined in claim 1 wherein the first drive means comprises a first drive motor mounted on the stationary support and only one ball lead screw connected between the drive motor and a central portion of the work table for moving the table back and forth in the first coordinate direction.

3. A high accuracy positioning system as defined in claim 2 wherein the second drive means comprises a second drive motor mounted on the stationary support and only one ball lead screw connected between the drive motor and the tool carriage for moving the carriage back and forth in the second coordinate direction.

4. A high accuracy positioning system for moving a tool and a workpiece as defined in claim 1 wherein the first reflector is a first surface mirror having a reflective surface perpendicular to the first coordinate direction.

5. A high accuracy positioning system for moving a tool and a workpiece as defined in claim 1 wherein the first reflector is a mirror mounted along the periphery of the work table.

6. A high accuracy positioning system for a tool and a workpiece as defined in claim 1 wherein the movable work table is mounted on the stationary support by two generally parallel ways, only one of the two ways being rigidly aligned relative to the stationary support and the work table to establish and control the path of movement in the first coordinate direction.

7. A high accuracy positioning system as defined in claim 6 wherein the other of the two ways is resiliently connected between the table and the stationary support to accommodate any tolerances between the two ways.

8. A high accuracy positioning system for moving a tool and a workpiece as defined in claim 1 wherein the tool carriage has a tool with a tool axis extending in orthogonal relationship with the first and second coordinate directions; and the first and second interferometers are mounted with the measuring axes of the interferometers intersecting the tool axis at each position of the tool carriage and the table.

9. A high accuracy positioning system for moving a tool and a workpiece as defined in claim 1 wherein the first interferometer is a plane mirror interferometer.

10. A high accuracy positioning system as defined in claim 1 including a laser mounted on the stationary support and a beam splitter operating between the laser and the first and second interferometers to direct beams to the interferometers from the beam splitter, the beam splitter being mounted on the stationary support to direct a split beam to the first interferometer on the movable tool carriage along an axis extending in the second coordinate direction whereby the beam splitter and the first interferometer remain in operative communication at each position of the tool carriage.

11. A photoplotter comprising:

a stationary frame;

a work table defining a support surface for holding a film during plotting and movable back and forth on the frame in a first coordinate direction by a first drive motor;

a photohead movable back and forth on the frame over the table in the second coordinate direction by a second drive motor; and a dual-axis, single elongated mirror interferometer system for measuring movements of the film and the photohead relative to one another including:

a first interferometer mounted on the plotting carriage and having a measuring axis extending from the carriage in the first coordinate direction parallel with the support surface of the work table;

a reflective mirror mounted along one edge of the work table and having a reflective surface elongated in the second coordinate direction and extending perpendicular to and being intersected by the measuring axis of the first interferometer for measuring movements of the table relative to the photohead in the first coordinate direction; and a second interferometer and an associated reflector mounted with the measuring axes of the interferometer extending in the second coordinate direction between the stationary frame and the photohead at each position of the photohead for measuring movements of the head relative to the frame.

12. A photoplotter having a frame, work table and photohead as defined in claim 11 wherein the dual-axis, single mirror interferometer system has the measuring axes of the first and second interferometers intersecting the optical axis of the photohead at each relative position of the photohead and table.

13. A photoplotter as in claim 11 wherein the dual-axis, single mirror interferometer system further includes a laser and a beam splitter mounted on the stationary frame and transmitting laser beams to both the first and the second interferometers.

14. A photoplotter having a frame, a movable work table and a movable photohead as in claim 11 or 13 wherein the dual-axis, single mirror interferometer system has the second interferometer mounted on the frame and the associated reflector mounted on the photohead.

15. A photoplotter as in claim 13 wherein the dual-axis, single mirror interferometer system has first and second photodetectors mounted with the laser on the frame and responsive respectively to fringes produced by the first and second interferometers.

* * * * *